United States Patent
Kronfeld et al.

(10) Patent No.: US 9,864,917 B1
(45) Date of Patent: Jan. 9, 2018

(54) AVIONICS DATA CAPTURING SYSTEM, DEVICE, AND METHOD

(71) Applicant: Rockwell Collins, Inc., Cedar Rapids, IA (US)

(72) Inventors: Kevin Michael Kronfeld, Cedar Rapids, IA (US); Roberto N. Cormack, Cypress, TX (US); Matthew Michael Lorch, Alburnett, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 0 days.

(21) Appl. No.: 15/269,116

(22) Filed: Sep. 19, 2016

(51) Int. Cl.
| G06K 9/62 | (2006.01) |
| G06K 9/00 | (2006.01) |
| G06T 7/00 | (2017.01) |
| B64D 47/08 | (2006.01) |
| B64D 43/00 | (2006.01) |

(52) U.S. Cl.
CPC ......... G06K 9/00832 (2013.01); B64D 43/00 (2013.01); B64D 47/08 (2013.01); G06K 9/6267 (2013.01); G06T 7/0044 (2013.01); *G06K 2209/01* (2013.01); *G06K 2209/03* (2013.01); *G06T 2207/10048* (2013.01); *G06T 2207/30268* (2013.01)

(58) Field of Classification Search
CPC .......... G06K 2209/03; G06K 9/00832; B64D 2045/0035; B64D 47/08; G06T 2207/30268
See application file for complete search history.

(56) References Cited

U.S. PATENT DOCUMENTS

| 8,600,675 | B1 | 12/2013 | Borghese et al. |
| 8,779,944 | B2* | 7/2014 | Weinmann ............. B64D 45/00 340/438 |
| 9,117,366 | B1 | 8/2015 | Seah et al. |
| 2003/0138146 | A1* | 7/2003 | Johnson .................. G06K 9/00 382/190 |

* cited by examiner

*Primary Examiner* — Brian Werner
(74) *Attorney, Agent, or Firm* — Daniel M. Barbieri; Donna P. Suchy; Angel N. Gerdzhikov

(57) ABSTRACT

A system, device, and method for capturing avionics data are disclosed. The avionics data capturing system could include an indicating device(s), image capturing device(s), a processing unit (PU), and a user system(s). The PU may acquire image data captured by the image capturing device(s) such as a camera sensor and/or infrared sensor, where the image data may be representative of an image of an object image(s) of a vehicle component(s) being viewed by an occupant located in the vehicle; classify the object image(s) as a function of a contextual image classification algorithm; determine a location for each classified object image as a function of the classified reference scale image(s); generate output data representative of each classified object image; and provide the output data to the user system(s). When received, a user(s) of the user system(s) may be presented with information regarding the component(s) being viewed by the occupant.

20 Claims, 8 Drawing Sheets

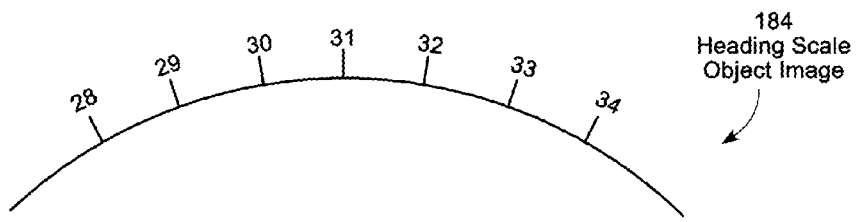
FIG. 3D
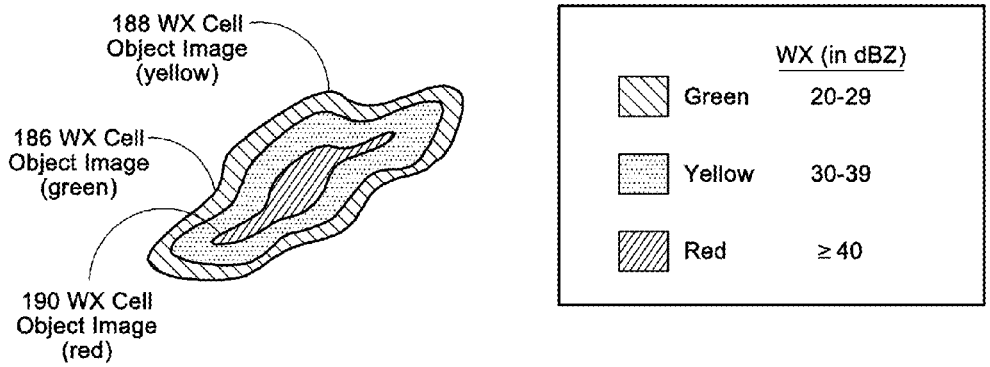
FIG. 3E
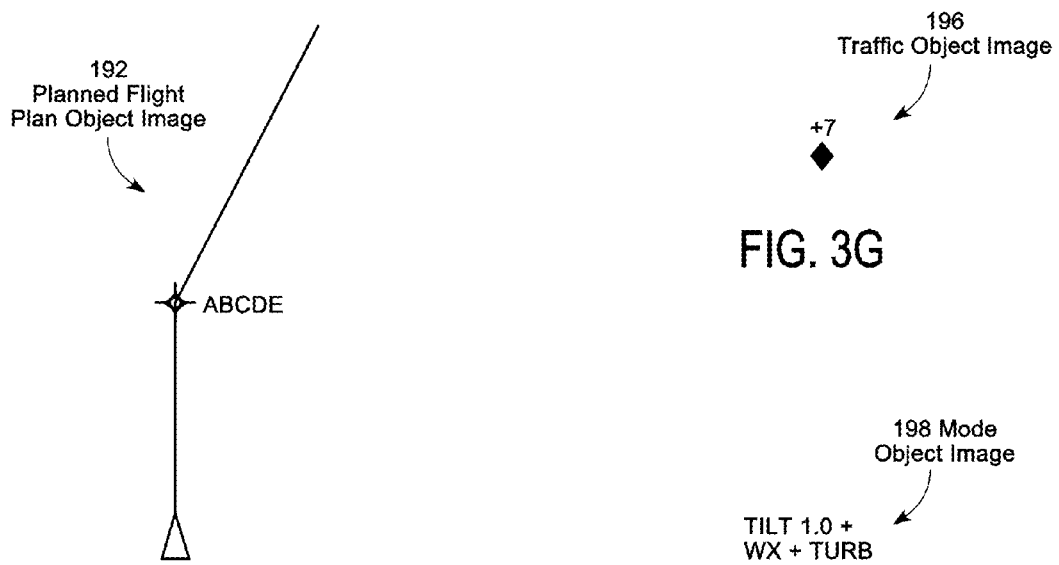
FIG. 3F
FIG. 3G
FIG. 3H

AVIONICS DATA CAPTURING SYSTEM, DEVICE, AND METHOD

BACKGROUND

Aircraft indicators provide a pilot with information. Some information may be significant including, but not limited to, information regarding weather, navigation, status, and/or surveillance. Also, this information may be valuable to others located externally to the aircraft including other aircraft and/or those of the ground, for it may be further processed and/or distributed to others.

For example, in-flight weather radar information acquired by a weather radar system of an aircraft in flight could be provided via datalink between the aircraft and an external user. Because knowledge of this information could be critical to others and the lack thereof could raise an issue of safety, the ability to acquire and disseminate this information may enhance the safety of flight for many other aircraft.

The field of aviation has developed standards related to the acquisition weather information data, the transmission of this information data to an onboard display, and the display of this weather information to the pilot. If a person is external to the aircraft and wishes to view the same information being presented to the pilot, the data would have to be transmitted via a datalink. The amount of data sent via a datalink that is processed under the current standards and needed to replicate the same image being displayed on the pilot's indicator for an indicator on the ground could be extensive.

SUMMARY

Embodiments of the inventive concepts disclosed herein are directed to a system, device, and method for capturing avionics data of an aircraft in flight. The capturing avionics data system could be employed to reduce the burden of transmitting an extensive amount of data.

In one aspect, embodiments of the inventive concepts disclosed herein are directed to a system for capturing avionics data. The system could include one or more indicating devices, one or more image capturing devices, a processing unit (PU), and a user system(s).

In a further aspect, embodiments of the inventive concepts disclosed herein are directed to a device for capturing avionics data. The device could include the PU configured to perform the method in the paragraph that follows.

In a further aspect, embodiments of the inventive concepts disclosed herein are directed to a method for capturing avionics data. When properly configured, the PU may acquire image data captured by the image capturing device(s) such as a camera sensor and/or infrared sensor, where the image data may be representative of an image of an object image(s) of an aircraft component(s) viewable to an occupant located in an aircraft; classify the object image(s) as a function of a contextual image classification algorithm; generate output data representative of each classified object image; and provide the output data to the user system(s). When received, a user(s) of the user system(s) may be provided with information regarding the component(s) being viewed by the occupant of the aircraft.

BRIEF DESCRIPTION OF THE DRAWINGS

FIG. 3D depicts an exemplary embodiment of a heading scale included in the captured image of FIG. 3B.

FIG. 3E depicts an exemplary embodiment of a plurality of weather cells included in the captured image of FIG. 3B.

FIG. 3F depicts an exemplary embodiment of a planned flight path included in the captured image of FIG. 3B.

FIG. 3G depicts an exemplary embodiment of aircraft traffic included in the captured image of FIG. 3B.

FIG. 3H depicts an exemplary embodiment of a radar mode indication included in the captured image of FIG. 3B.

DETAILED DESCRIPTION

In the following description, several specific details are presented to provide a thorough understanding of embodiments of the inventive concepts disclosed herein. One skilled in the relevant art will recognize, however, that embodiments of the inventive concepts disclosed herein can be practiced without one or more of the specific details, or in combination with other components, etc. In other instances, well-known implementations or operations are not shown or described in detail to avoid obscuring aspects of various embodiments of the inventive concepts disclosed herein.

Figure 1A:
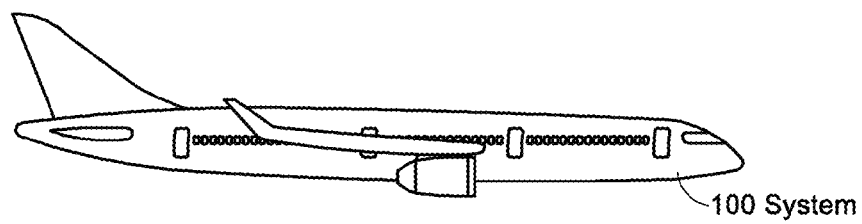
FIG. 1A depicts an aircraft configured with an avionics data capturing system according to the inventive concepts disclosed herein.
Figure 1B:
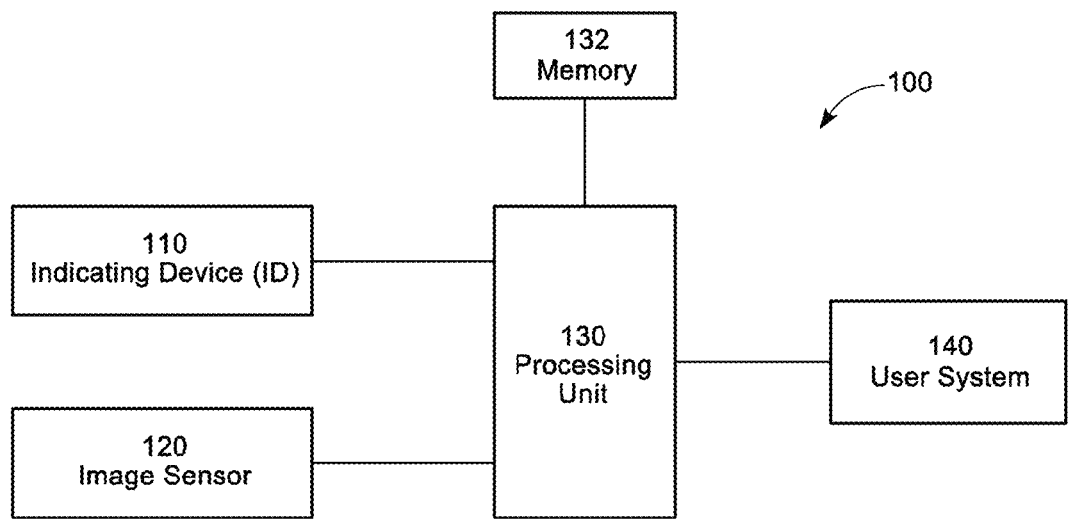
FIG. 1B depicts a functional block diagram of the avionics data capturing system of FIG. 1A.

Referring now to FIGS. 1A-1B, an embodiment of an avionics data capturing system 100 suitable for implementation of the inventive concepts described herein includes an indicating device (ID) 110, an image sensor 120, a processing unit (PU) 130, and an user system 140.

Figure 1C:
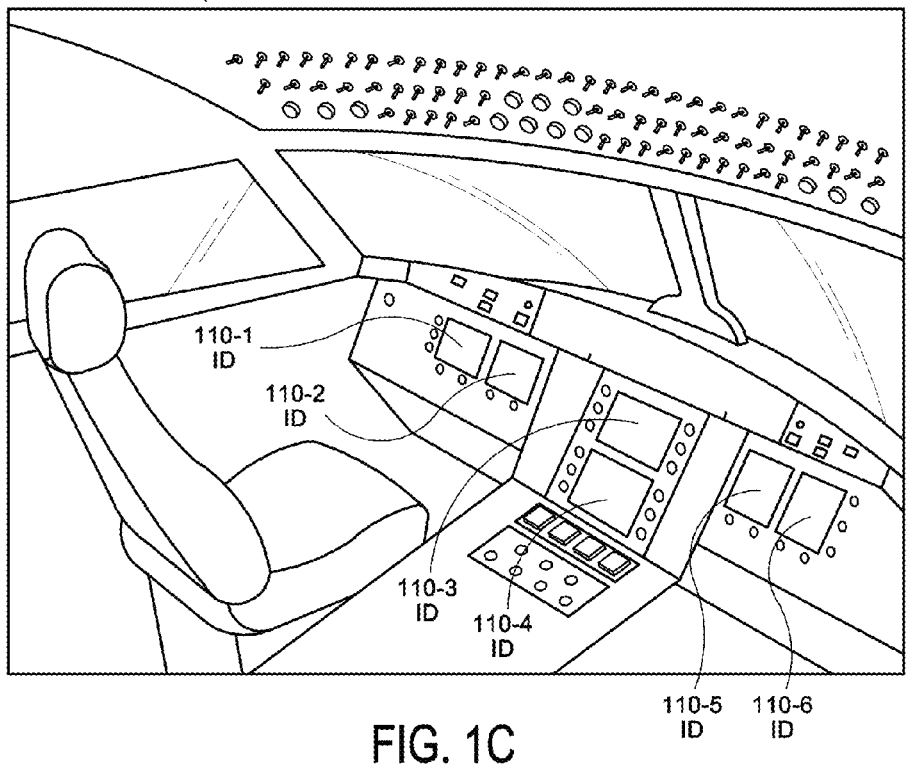
FIG. 1C depicts an exemplary embodiment of an aircraft configured with a plurality of indicating units.

The ID 110 may include at least one ID configured to present information visually to the pilot. Referring now to FIG. 1C, an exemplary image of an aircraft cockpit 150 is illustrated in which there are multiple IDs 110-1 through 110-6 that may convey visual information to the pilot. It should be noted that, although the discussion of the inventive concepts will be drawn towards images produced from inside an aircraft, the inventive concepts include those that may be produced from inside any vehicle operated by a human and/or machine and operated over land (e.g., automobiles, trucks, motorcycles) and/or on or below water.

Referring back to FIG. 1B, the ID 110 could include an analog indicator and/or a digital indicator. In some embodiments, the analog indicator which typically presents an indication to a pilot with one or more moveable components (e.g., needles). It may be installed in place of digital indicators and/or alongside of digital indicators. In some embodiments, the ID 110 could include structure assembly enclosing the ID 110 to which tactile devices (e.g., buttons, knobs, switches) are installed.

In some embodiments, the ID 110 could include a digital indicator which typically presents an electronically-generated image to a pilot. The digital indicator could be part of an Electronic Flight Information System (EFIS) and/or could include, but is not limited to, a Primary Flight Display (PFD), Navigation Display (ND), Head-Up Display (HUD), Head-Down Display (HDD), Multi-Purpose Control Display, Engine Indicating and Crew Alerting System, Electronic Centralized Aircraft Monitor, Multi-Function Display, Side Displays, Electronic Flight Bags, Portable Electronic Devices (e.g., laptops, smartphones, tablets), and/or user-wearable devices such as wrist- and head-mounted devices. The ID 110 may be configured to present one or more display(s) or image(s). In some embodiments, the terms "display" and "image" are interchangeable and treated synonymously.

The image sensor 120 could include one or more image sensors configured to capture image data representative of an image of one or more real-time images being presented by one or more IDs 110 located in the cockpit and/or positions of tactile devices (e.g., switch positions). In some embodiments, the image sensor 120 could include a camera sensor(s) designed to work within the visible electromagnetic spectrum bandwidth and used to detect visible light detectable by the human eye. In some embodiments, the image sensor 120 could include an infrared (IR) sensor(s) may be designed to work within the IR electromagnetic spectrum bandwidth to determine a depth (i.e. distance) to the ID 110 and/or tactile devices. It should be noted that data described herein such as the image data could include any analog or digital signal, either discrete or continuous, which could contain information or be indicative of information.

Figure 2A:
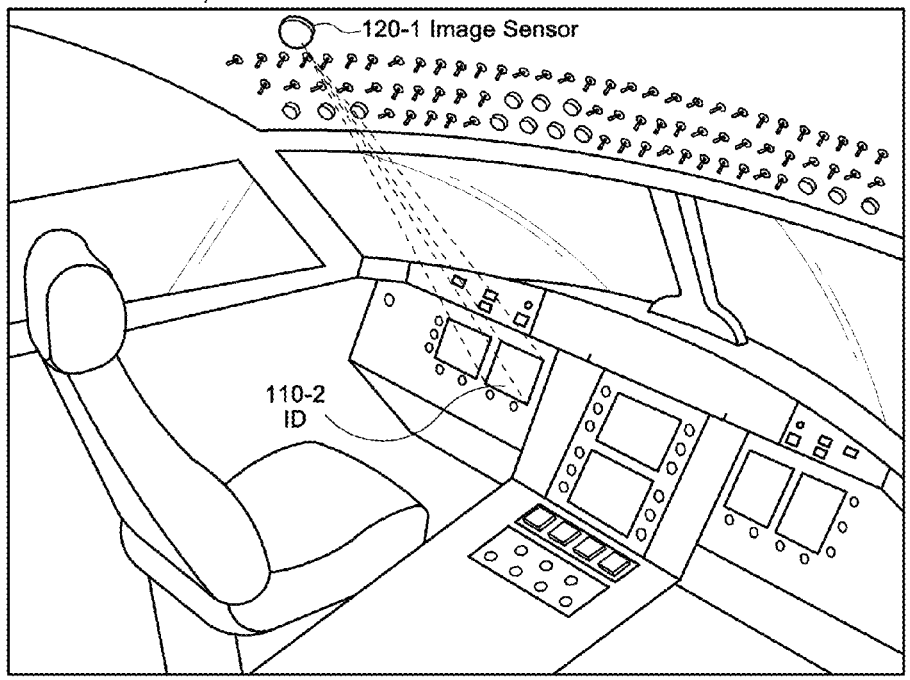
FIG. 2A depicts an exemplary embodiment of an image sensor capturing an image presented on an indicating unit.
Figure 2B:
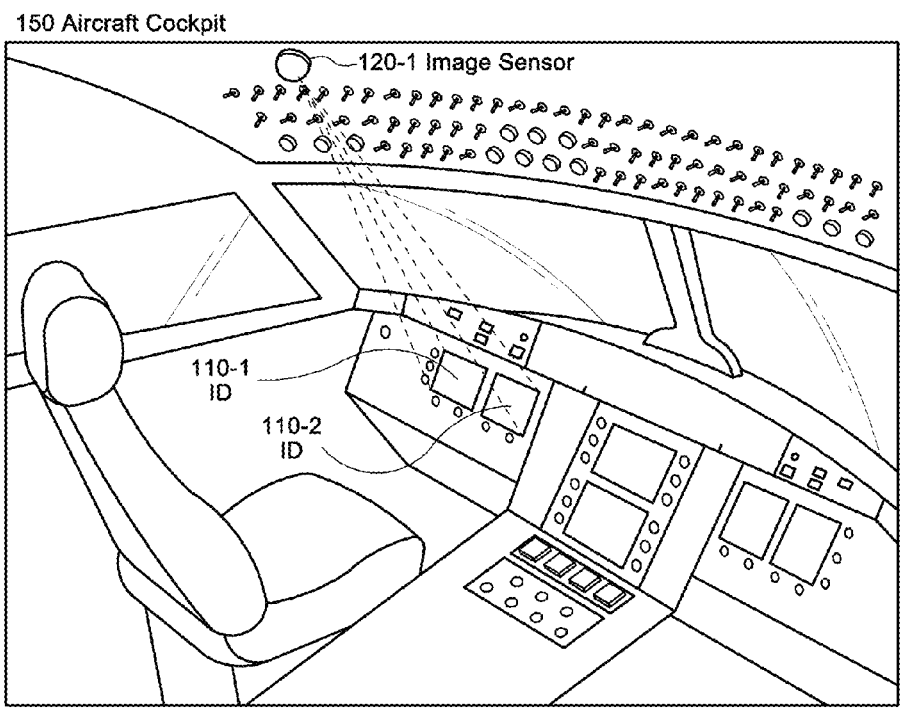
FIG. 2B depicts an exemplary embodiment of the image sensor of FIG. 2A capturing images presented on a plurality of indicating units.
Figure 2C:
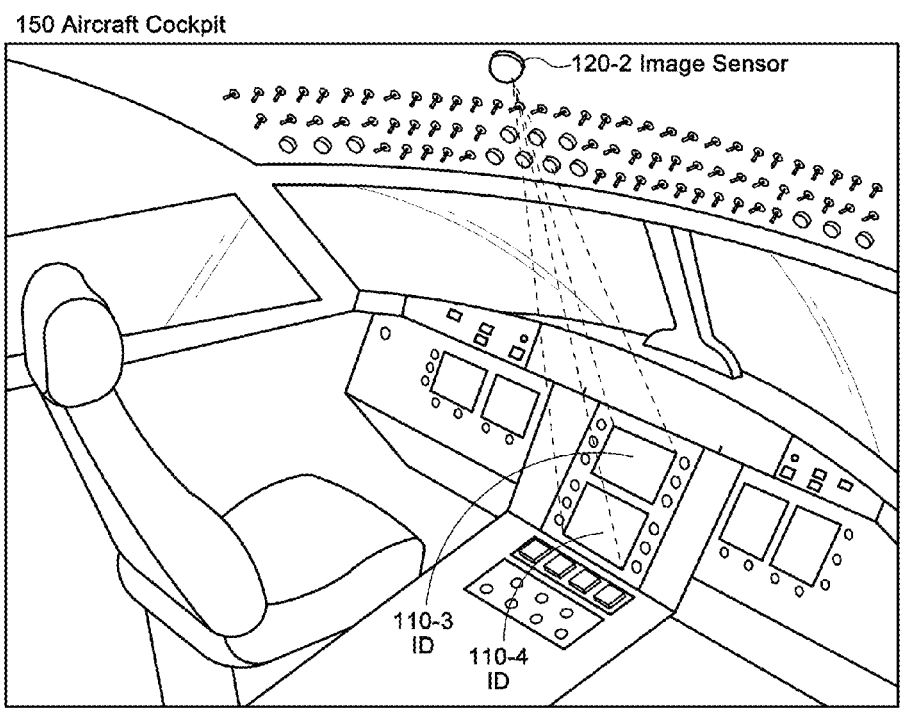
FIG. 2C depicts an exemplary embodiment of a second image sensor capturing images presented on a plurality of indicating units.

Referring to FIGS. 2A-2C, an image sensor 120-1 could be configured to capture images from one or more IDs 110. In some embodiments, an image sensor 120-1 could be configured to capture image data representative of an image being displayed on a single ID 110-2 as shown in FIG. 2A. In some embodiments, the image sensor 120-1 could be configured to capture image data representative of a plurality of images presented on multiple IDs such as, for example, the IDs 110-1 and 110-2 shown in FIG. 2B. In some embodiments, an additional image sensor 120-2 could be configured to capture image data representative of a plurality of images presented on one or more multiple IDs such as, for example, the images presented on IDs 110-3 and 110-4 shown in FIG. 2C.

Referring back to FIG. 1B, the PU 130 could include any electronic data processing unit which executes software or computer instruction code that could be stored, permanently or temporarily, in a digital memory storage device or a non-transitory computer-readable media (generally, memory 132) including, but not limited to, random access memory (RAM), read-only memory (ROM), compact disc (CD), hard disk drive, diskette, solid-state memory, Personal Computer Memory Card International Association card (PCM-CIA card), secure digital cards, and compact flash cards. The PU 130 may be driven by the execution of software or computer instruction code containing algorithms developed for the specific functions embodied herein. The PU 130 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the PU 130 could also include more than one electronic data processing unit. In some embodiments, the PU 130 could be a processor(s) used by or in conjunction with any other system of the aircraft including, but not limited to, the ID 110, the image sensor 120, and the user system 140.

In some embodiments, the terms "programmed" and "configured" are synonymous. The PU 130 may be electronically coupled to systems and/or sources to facilitate the receipt of input data. In some embodiments, operatively coupled may be considered as interchangeable with electronically coupled. It is not necessary that a direct connection be made; instead, such receipt of input data and the providing of output data could be provided through a bus, through a wireless network, or as a signal received and/or transmitted by the PU 130 via a physical or a virtual computer port. The PU 130 may be programmed or configured to execute the method discussed in detail below. In some embodiments, the PU 130 may be programmed or configured to receive data from various systems and/or units including, but not limited to, the ID 110 and the image sensor 120. In some embodiments, the PU 130 may be programmed or configured to provide output data to various systems and/or units including, but not limited to, the user system 140.

The user system 140 could be any system(s) employed by one or more users which may receive the output data provided by the PU 130. In some embodiments, the user system 140 could integrate or fuse the output data with similar data from another aircraft and/or weather forecast system such as, for example, the Rapid Update Cycle (RUC) or Weather Research and Forecasting Model (WRF) to create new observations and forecasts from the output data.

In some embodiments, the user of the user system 140 could be located inside the aircraft such as, but not limited to, a pilot who could employ a tablet on which the output data could be used, in conjunction with a flight planning application or "app" installed in the tablet, to plan the remainder of the flight and/or review an alternate course of action. In some embodiments, the user could be located external to the aircraft such as, but not limited to, a provider of information management services an air navigation service provider (ANSP) and/or a dispatch center (DC) discussed by Borghese et al in U.S. Pat. No. 8,600,675 entitled "System and Method for Generating Trajectory Data for an Aircraft in Flight" and by Seah et al in U.S. Pat. No. 9,117,366 entitled "Communication Methods Employed by Participants in a Trajectory Management Operations" both of which are incorporated by reference in their entirety.

In some embodiments, the user could include Rockwell Collins, Inc., a United States corporation providing ARINC aviation information management services through an ARINC air-to-ground network. In some embodiments, the user could include an aviation-governing authority such as the Federal Aviation Administration (FAA) in the United States (US) and/or a government provider of weather services such as the National Weather Service (NWS) in the US. In some embodiments, the user could include an airline operations center which employs flight dispatchers who may be responsible for planning and monitoring the progress of an aircraft in flight, where a flight dispatcher may have the authority to delay, divert, and/or cancel a flight at any time.

Figure 3A:
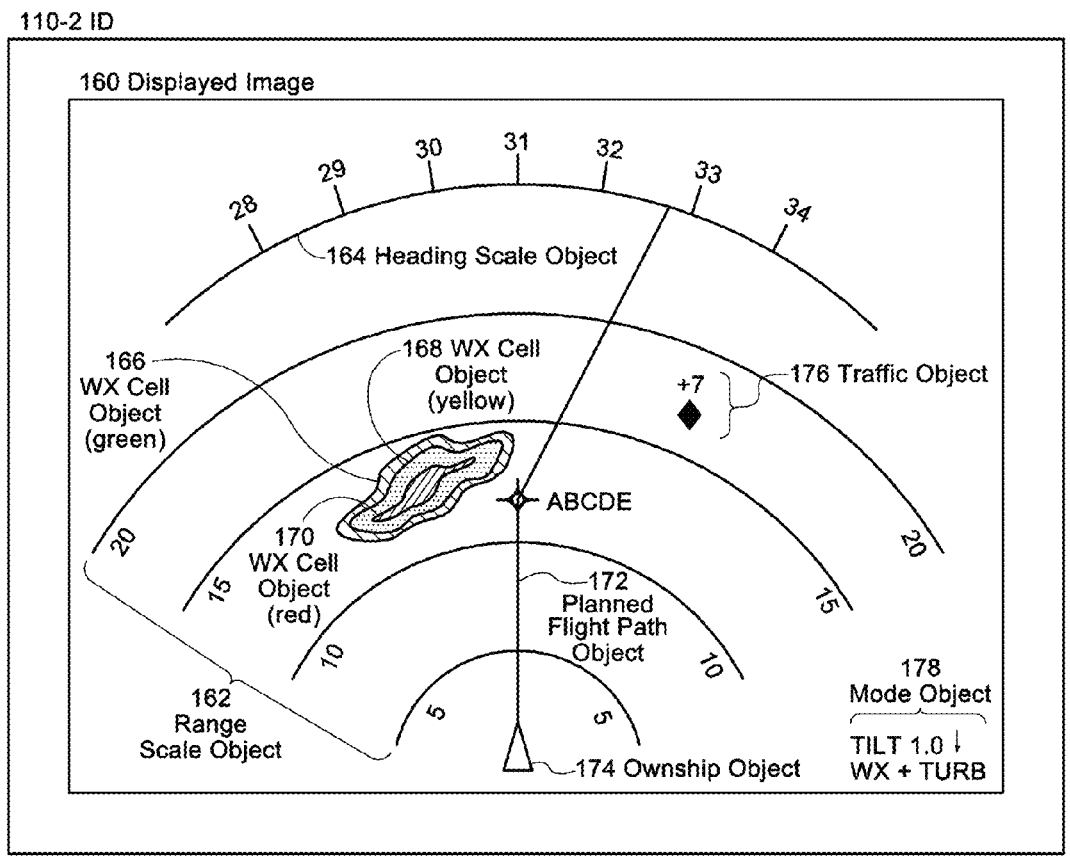
FIG. 3A depicts an exemplary embodiment of a displayed image presented on an indicating unit.
Figure 3A:
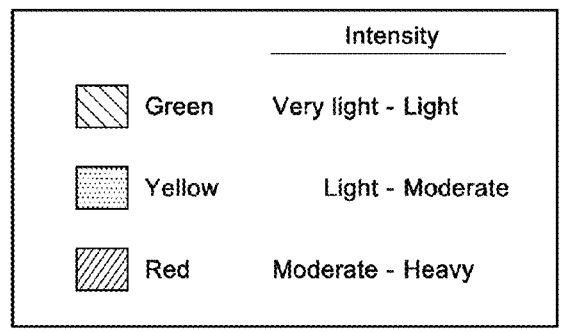

Some advantages and benefits of the inventive concepts disclosed herein are shown in FIGS. 3A through 3H, illustrating how avionics data may be captured by the avionics data capturing system 100. Referring now to FIG. 3A, an exemplary displayed image 160 being displayed digitally on ID 110-2 is shown, where the ID 110-2 will be assumed to be ID 110-2 shown in FIG. 2A. It should be noted that, although the discussion of the inventive concepts will be drawn towards digitally display indicators, the inventive concepts are not limited to indications digitally displayed.

As observed in FIG. 3A, the displayed image 160 has a plurality of indications of objects including four arcs of a range scale 162 with increments of five nautical miles; a heading scale 164 with increments of ten degrees; weather (WX) cells 166, 168, and 170 indicating three levels of rain intensity; planned flight path 172 of ownship 174 that crosses waypoint ABCDE; traffic 176 of an aircraft that is 700 feet above ownship; and characters indicative of a mode 178 of radar that may be selected by the pilot for determining the extent of radar system information to be presented and an elevation plane at which a radar antenna is pointed; here, the pilot has selected a mode for the indicating device which will present WX and turbulence (TURB) information provided by a radar system, and this information corresponds to measurements taken as the antenna is tilted one degree downward (TILT 1.0).

Figure 3B:
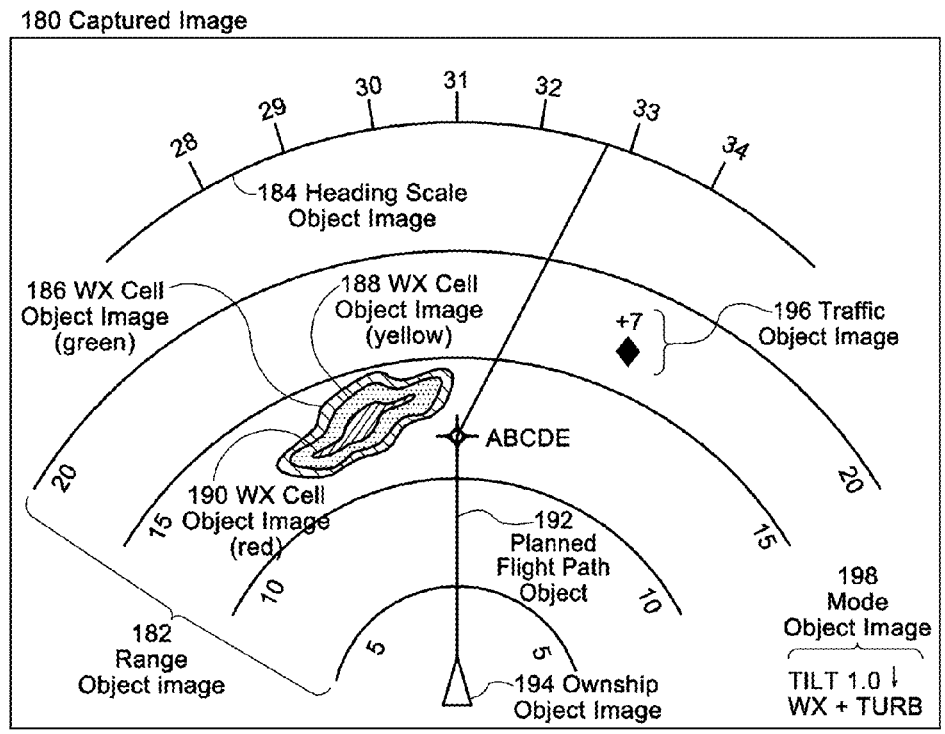
FIG. 3B depicts an exemplary embodiment of a captured image of the displayed image of FIG. 3A.

Referring now to FIG. 3B, an exemplary captured image 180 is shown, where the captured imaged 180 may be an image objects of the indication 160 captured by one or more image sensors 120. As shown, the captured image includes a range scale object image 182; a heading scale object image 184; WX cell object images 186, 188, and 190; a planned flight object image 192; an ownship object image 194; a traffic object image 196; and a mode object image 198.

In some embodiments, the PU 130 may be programmed or configured with one or more contextual image classification algorithms known to those skilled in the art that may be applied to the captured image 180. In some embodiments, the contextual image classification algorithm could include an algorithm for pattern recognition and/or optical character recognition.

Figure 3C:
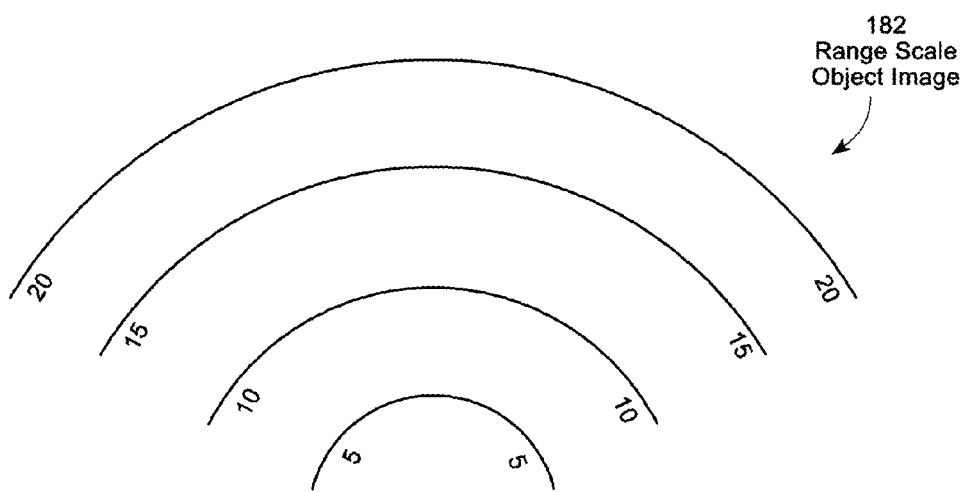
FIG. 3C depicts an exemplary embodiment of a range scale included in the captured image of FIG. 3B.

Referring now to FIG. 3C, the range scale object image 182 is illustrated. In some embodiments, the arcs of range scale object image 182 could have been generated by the ID 110-2, where the numeric representations may be based upon, for instance, a range setting selected by the pilot through a tactile device.

In some embodiments, the PU 130 could be programmed to recognize a context of a pattern that includes a plurality of static, evenly-spaced, concentric arcs and/or static, alphanumeric characters adjacent to the arcs. After the recognition has been made, the context could be classified as a range scale with numerical increments. Once the classification has been made, the PU 130 could be programmed to employ the range scale with the values of the recognized characters and determine distances to the other objects represented by the object images relative to the location of ownship.

Referring now to FIG. 3D, the heading scale object image 184 is illustrated. In some embodiments, the heading scale object image 184 could include a stationary arc and moveable (i.e., dynamic, variably-positioned) tick marks generated by the ID 110-2, where the position of the tick marks may be dependent upon heading data provided by a navigation system known to those skilled in the art such as, but not limited to, a flight management system (FMS).

In some embodiments, the PU 130 could be programmed to recognize a context of a pattern that includes a single arc with a plurality tick marks perpendicularly extended from the arc and alphanumeric characters adjacent to the tick marks. After the recognition has been made, the context could be classified as a heading scale with numerical increments. Once the classification has been made, the PU 130 could be programmed to employ the heading scale with the values of the recognized characters and determine bearings to the other objects represented by the object images relative to the location of ownship. In some embodiments, output data representative of the classification and bearings to the objects may be generated by the PU 130 and provided to the user system 140.

In some embodiments, the distances and bearings to the other objects may be used in determining the geographic locations and/or altitude of the objects. In some embodiments, the latitude, longitude, and/or altitude of the objects may be determined if data representative of ownship's latitude, longitude, and/or altitude has been provided to the PU 130.

In some embodiments, indications of latitude, longitude, and/or altitude may be displayed in the indication 160 and included the captured image 180 as an object image of ownship's geographic location and/or altitude. After a recognition has been made, the context could be classified as ownship's geographic location and/or altitude. Once the classification has been made, the PU 130 could be programmed to employ the values of the recognized characters and determine the geographic locations and/or altitudes to the other objects represented by the object images relative to a reference system of the Earth. In some embodiments, output data representative of the classification and geographic locations and/or altitudes to the other objects may be generated by the PU 130 and provided to the user system 140.

Referring now to FIG. 3E, the WX cell object images 186, 188, and 190 are illustrated. In some embodiments, an individual cell could include a color and/or a fill pattern, where the color and/or the fill pattern may be dependent upon WX data provided by a source of WX data such as, but not limited to, a radar system installed in ownship. In some embodiments, the PU 130 could be programmed to recognize a context of color and/or fill patterns. After the recognition has been made, the context could be classified as rain having one of a plurality of reflectivity decibels (dBZ). Once the classification has been made for each cell, locations of the boundary of the WX cell may be determined. In some embodiments, output data representative of the classification and this location information of each dBZ may be generated by the PU 130 and provided to the user system 140.

Referring now to FIG. 3F, the planned flight path 192 of ownship crossing waypoint ABCDE is illustrated. In some embodiments, the PU 130 could be programmed to recognize a context of a pattern that includes a symbol assigned to ownship (here, an isosceles triangle) and a line adjacent to but extending away from ownship; in some embodiments, the pattern could include the line extending to a waypoint symbol accompanied by textual characters showing the name of the waypoint. After the recognition has been made, the context could be classified as a planned flight path. Once the classification has been made, locations defining the planned flight path may be determined. In some embodiments, output data representative of the classification and this location information may be generated by the PU 130 and provided to the user system 140.

Referring now to FIG. 3G, the traffic 196 of an aircraft is illustrated. In some embodiments, the PU 130 could be programmed to recognize a context of a pattern that could include one of a plurality of symbols accompanied by a numerical indication that may be assigned the aircraft traffic (here, a filled triangle). After the context has been recognized, the pattern could be classified as aircraft traffic. Once the classification has been made, the location of the aircraft traffic may be determined. In some embodiments, output data representative of the classification and location to the traffic may be generated by the PU 130 and provided to the user system 140.

Referring now to FIG. 3H, the mode object image 198 is illustrated. In some embodiments, the PU 130 could be programmed to recognize a context of a pattern of alphanumeric characters located in the bottom right hand corner of an image. After the recognition has been made, the context could be classified as a mode of the indicting device. Once the classification has been made, the PU 130 may be programmed to limit its recognition to those objects that could be specifically presented for the mode. In some embodiments, output data representative of the classification and mode may be generated by the PU 130 and provided to the user system 140.

Figure 4A:
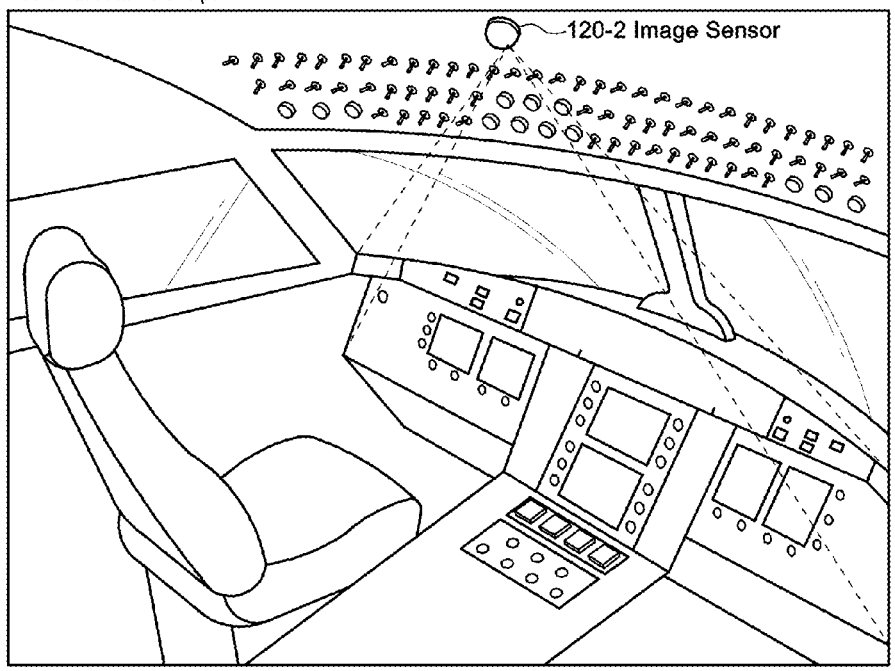
FIG. 4A depicts an exemplary embodiment of the image sensor of FIG. 2C capturing an image of a forward instrument panel.

Referring now to FIG. 4A, the image sensor 120-2 of FIG. 2C has been configured to capture the whole forward instrument panel in the aircraft cockpit 150. The configuration of the instrument panel could be determined by a manufacturer and/or end-user.

Figure 4B:
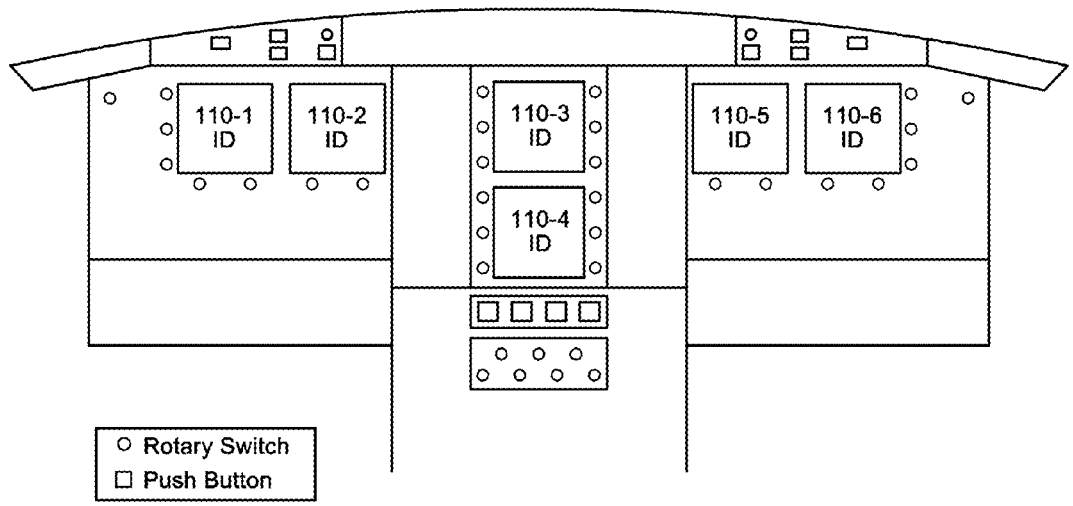
FIG. 4B depicts an exemplary embodiment of a configuration map of the forward instrument panel of FIG. 4A.

Referring now to FIG. 4B, an instrument panel configuration map may be developed once the configuration has been determined, where this configuration map may define the configuration of the panel in two-dimensions and/or three-dimensions as well as shapes, sizes, and/or relative locations. As observed, devices including the IDs 110-1 through 110-6 and various tactile devices of rotary switches and pushbuttons are illustrated. In some embodiments, the PU 130 could be programmed with contextual image classification algorithm(s) to classify these devices from the configuration map. After a captured image has been made of the instrument panel either in part or in whole, the PU 130 could be programmed to recognize a context of a pattern associated with the configuration map, and based upon recognition, each device may be classified.

In some embodiments, one or more of the IDs 110-1 through 110-6 may be specifically identified, where the number and variety of indications appearing on each may be specifically limited. When captured image is produced of the indications, a subsequent application of a contextual image classification algorithm(s) may be limited to only those indications for which the ID has been configured.

In some embodiments, one or more of the tactile devices may be identified, where the position of the tactile device may be an indication of a pilot's selection. In some embodiments, the image sensor 120-2 could be a camera sensor. When an image of the tactile device(s) such as, for example, a rotary switch is captured, object images of the tactile device and a position to which it has been selected may be classified using a contextual image classification algorithm(s). After being classified, output data representative of the classification and position may be generated by the PU 130 and provided to the user system 140.

In some embodiments, the image sensor 120-2 could be an IR depth sensor. When an image of the tactile device(s) such as, for example, a pushbutton switch is captured, object images of the tactile device and a depth, shape, size, and/or relative location to the tactile device (indicative of, for example, the switch's position) may be classified using a contextual image classification algorithm(s). After being classified, output data representative of the classification and position may be generated by the PU 130 and provided to the user system 140.

Figure 5:
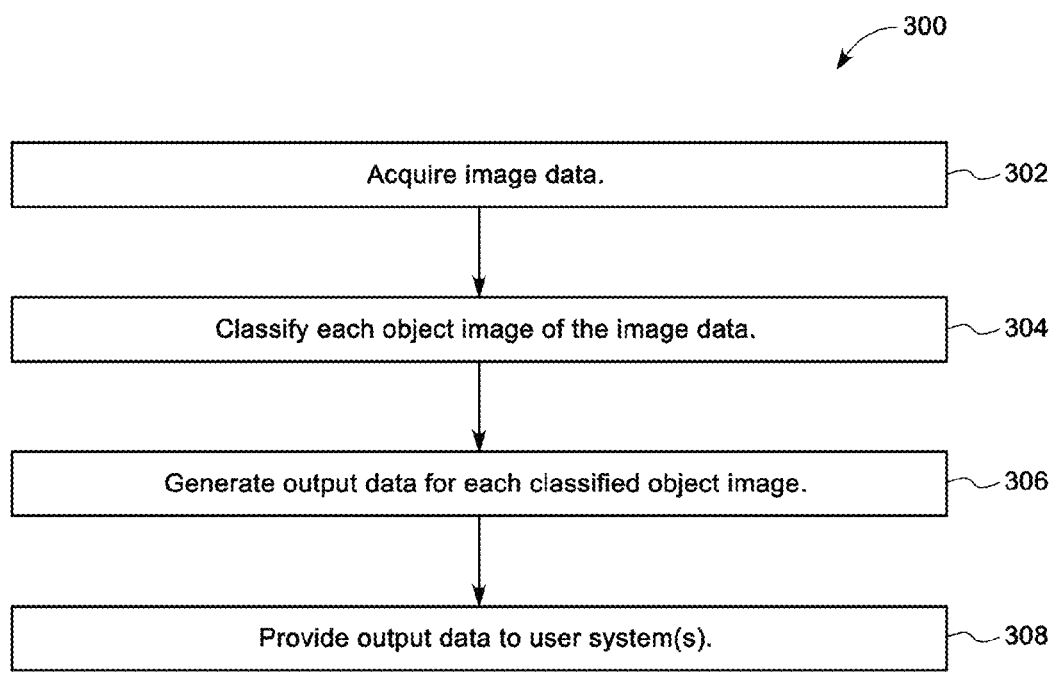
FIG. 5 depicts an exemplary embodiment of a flowchart disclosing a method for capturing avionics data according to the inventive concepts disclosed herein.

FIG. 5 depicts flowchart 300 disclosing an example of a method for capturing avionics data, where the PU 130 may be programmed or configured with instructions corresponding to the modules embodied in flowchart 300. In some embodiments, the PU 130 may be a processor or a combination of processors found in the ID 110, the image sensor 120, the user system 140, or any other system suitable for performing the task. Also, the PU 130 may be a processor of a module such as, but not limited to, a printed circuit card having one or more input interfaces to facilitate the two-way data communications of the PU 130, i.e., the receiving and providing of data. As necessary for the accomplishment of the following modules embodied in flowchart 300, the acquiring of data is synonymous and/or interchangeable with the receiving and/or retrieving of data, and the providing of data is synonymous and/or interchangeable with the making available or supplying of data.

The method of flowchart 300 begins with module 302 with the PU 130 acquiring captured image data from one or more image sensors 120 including a camera sensor and/or an infrared sensor, where the captured image data may be representative of one or more object images of one or more components located inside a vehicle. In some embodiments, the component(s) could be one or more IDs 110 and/or one or more tactile devices. In some embodiments, each object image(s) could be an image(s) presented by the ID 110. In some embodiments, the ID 110 could be a digital indicator and/or an analog indicator. In some embodiments, each object image(s) could be an image(s) of switch position(s) of the tactile device(s). In some embodiments, each object image(s) could include two- or three-dimensional distances and/or relative locations of the components from the image sensor.

The method of flowchart 300 continues with module 304 with the PU 130 classifying the object image(s). In some embodiments, a contextual image classification algorithm may be applied to the object image(s) to make the classification(s).

The method of flowchart 300 continues with module 306 with the PU 130 generating output data representative of classification(s) of the classified object image(s). In some embodiments, the output data could be further representative of location(s) of the classified object image(s). In some embodiments, the classified object location(s) may be determined as a distance and relative bearing from ownship. In some embodiments, the classified object location(s) may be determined as a latitude, longitude, and/or altitude when navigation data representative of ownship's latitude, longitude, and/or altitude is provided.

The method of flowchart 300 continues with module 308 with the PU 130 providing the output data to the user system 140, where one or more users may be provided with information regarding the component(s) being viewed by the occupant. When received by the user system 140, the user(s) may be informed of one or more indications being presented to the viewer on one or more IDs 110. In some embodiments, the user(s) may be further informed of a position one or more tactile devices. Then, the method of flowchart 300 ends.

It should be noted that the steps of the method described above may be embodied in computer-readable media stored in a non-transitory computer-readable medium as computer instruction code. The method may include one or more of the steps described herein, which one or more steps may be carried out in any desired order including being carried out simultaneously with one another. For example, two or more of the steps disclosed herein may be combined in a single step and/or one or more of the steps may be carried out as two or more sub-steps. Further, steps not expressly disclosed or inherently present herein may be interspersed with or added to the steps described herein, or may be substituted for one or more of the steps described herein as will be appreciated by a person of ordinary skill in the art having the benefit of the instant disclosure.

As used herein, the term "embodiment" means an embodiment that serves to illustrate by way of example but not limitation.

It will be appreciated to those skilled in the art that the preceding examples and embodiments are exemplary and not limiting to the broad scope of the inventive concepts disclosed herein. It is intended that all modifications, permutations, enhancements, equivalents, and improvements thereto that are apparent to those skilled in the art upon a reading of the specification and a study of the drawings are included within the broad scope of the inventive concepts disclosed herein. It is therefore intended that the following appended claims include all such modifications, permutations, enhancements, equivalents, and improvements falling within the broad scope of the inventive concepts disclosed herein.

What is claimed is:

1. A system for capturing avionics data, comprising:
   at least one user system;
   at least one component located inside an aircraft; and
   at least one image capturing device configured to:
      capture image data representative of at least one object image of the at least one component seen by an occupant inside the aircraft; and
      provide the image data to a processing unit including at least one processor coupled to a non-transitory processor-readable medium storing processor-executable code and configured to:
         acquire the image data;
         recognize and classify a context of a pattern of each object image of the at least one object image as a function of a contextual image classification algorithm;
         determine object image information based upon the context classification of each object image;
         generate output data representative of the object image information and the context classification of each object image; and
         provide the output data to the at least one user system, whereby
            information provided by the at least one component seen by the occupant is provided to at least one user of the at least one user system.

2. The system of claim 1, wherein the at least one component is at least one of an indicating device and a tactile device.

3. The system of claim 2, wherein the at least one object image for each component of the at least one component is a plurality of object images presented by the indicating device.

4. The system of claim 2, wherein the at least one indicating device is at least one of a digital indicator and an analog indicator.

5. The system of claim 4, wherein the object image information includes location information for at least one object represented by an object image presented by the digital indicator.

6. The system of claim 2, wherein the at least one object image for each component of the at least one component is a plurality of object images of switch positions of the tactile device.

7. The system of claim 1, wherein the at least one image capturing device is at least one of a camera sensor and an infrared sensor.

8. A device for capturing avionics data, comprising:
   a processing unit including at least one processor coupled to a non-transitory processor-readable medium storing processor-executable code and configured to:
      acquire image data, where
         at least one component located inside an aircraft, and
         at least one image capturing device is configured to capture image data representative of at least one object image of the at least one component seen by an occupant inside the aircraft;
      recognize and classify a context of a pattern of each object image of the at least one object image as a function of a contextual image classification algorithm;
      determine object image information based upon the context classification of each object image;
      generate output data representative of the object image information and the context classification of each object image; and
      provide the output data to the at least one user system, whereby
         information provided by the at least one component seen by the occupant is provided to at least one user of the at least one user system.

9. The device of claim 8, wherein the at least one component is at least one of an indicating device and a tactile device.

10. The device of claim 9, wherein the at least one object image for each component of the at least one component is a plurality of object images presented by the indicating device.

11. The device of claim 9, wherein the at least one indicating device is at least one of a digital indicator and an analog indicator.

12. The device of claim 11, wherein the object image information includes location information for at least one object represented by an object image presented by the digital indicator.

13. The device of claim 9, wherein the at least one object image for each component of the at least one component is a plurality of object images of switch positions of the tactile device.

14. The device of claim 8, wherein the at least one image capturing device is at least one of a camera sensor and an infrared sensor.

15. A method for capturing avionics data, comprising:
   acquiring, by a processing unit including at least one processor coupled to a non-transitory processor-readable medium storing processor-executable code, image data, where
      at least one component located inside an aircraft, and
      at least one image capturing device is configured to capture image data representative of at least one object image of the at least one component seen by an occupant inside the aircraft;

recognizing and classifying a context of a pattern of each object image of the at least one object image as a function of a contextual image classification algorithm;

generating output data representative of the object image information and the context classification of each object image; and providing the output data to the at least one user system, whereby information provided by the at least one component seen by the occupant is provided to at least one user of the at least one user system.

16. The method of claim 15, wherein the at least one component is at least one of an indicating device and a tactile device.

17. The method of claim 16, wherein the at least one object image for each component of the at least one component is a plurality of object images presented by the indicating device.

18. The method of claim 16, wherein the at least one indicating device is at least one of a digital indicator and an analog indicator.

19. The method of claim 18, wherein the object image information includes location information for at least one object represented by an object image presented by the digital indicator.

20. The method of claim 16, wherein the at least one object image for each component of the at least one component is a plurality of object images of switch positions of the tactile device.

* * * * *